United States Patent
Doughan

(10) Patent No.: US 7,526,490 B2
(45) Date of Patent: Apr. 28, 2009

(54) METHOD OF AND SYSTEM FOR PROVIDING POSITIONAL BASED OBJECT TO XML MAPPING

(75) Inventor: Blaise Doughan, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 10/864,850

(22) Filed: Jun. 8, 2004

(65) Prior Publication Data

US 2005/0278358 A1    Dec. 15, 2005

(51) Int. Cl.
G06F 7/00    (2006.01)
G06F 17/30    (2006.01)

(52) U.S. Cl. .......................... 707/100; 707/1
(58) Field of Classification Search ................. 717/108; 715/513; 707/100, 1
See application file for complete search history.

(56) References Cited

U.S. PATENT DOCUMENTS

| | | | |
|---|---|---|---|
| 6,510,425 B1 * | 1/2003 | Okamoto et al. ................ 707/3 |
| 6,643,633 B2 * | 11/2003 | Chau et al. ...................... 707/1 |
| 6,718,516 B1 * | 4/2004 | Claussen et al. ............ 715/513 |
| 6,732,095 B1 * | 5/2004 | Warshavsky et al. ............ 707/5 |
| 6,836,778 B2 * | 12/2004 | Manikutty et al. .......... 707/102 |
| 6,999,956 B2 * | 2/2006 | Mullins ........................... 707/2 |
| 2001/0014900 A1 * | 8/2001 | Brauer et al. ................ 707/513 |
| 2002/0091702 A1 * | 7/2002 | Mullins ....................... 707/100 |
| 2003/0024975 A1 * | 2/2003 | Rajasekharan .............. 235/375 |
| 2004/0010752 A1 * | 1/2004 | Chan et al. .................. 715/513 |
| 2004/0015840 A1 * | 1/2004 | Walker ........................ 717/108 |
| 2004/0064466 A1 * | 4/2004 | Manikutty et al. ........... 707/100 |
| 2005/0278358 A1 * | 12/2005 | Doughan ..................... 707/100 |
| 2006/0101320 A1 * | 5/2006 | Dodds et al. ................. 715/500 |

OTHER PUBLICATIONS

"Schema for Object-Oreinted XML 2.0" W3C Note Jul. 30, 1999. http://www.w3.org/TR/Note-SOX/. Aug. 4, 2004.
"XML Namespaces Support in Pythong Tools, part 1" Author: Uche Ogbuji. Published on XML.COM http://www.xml.com/pub/a/2003/03/10/python.html. Downloaded http://www.xml.com/1pt/a/2003/03/10/python.html on Aug. 4, 2004.
"What is XML and Why Should I Care?" by Tony Stewart. http://www.topxml.com/xml/articles/whatisxml/Default.asp?printerversion=true Apr. 6, 2004.

* cited by examiner

Primary Examiner—Charles Rones
Assistant Examiner—Fariborz Khoshnoodi
(74) Attorney, Agent, or Firm—Park, Vaughan & Fleming LLP

(57) ABSTRACT

The present invention relates generally to computers and computer databases, and more specifically, to a method of and system for converting between Object-oriented classes and markup languages. One aspect of the invention is broadly defined as a method of converting data from a markup language format to an Object model, comprising the steps of: identifying an input markup language document, a destination Object and a markup schema; determining mappings between the input markup language document and the destination Object, including an indication of position for elements having the same name in the input markup language document; traversing the input markup language document; and generating corresponding software Objects with consideration for the position indication.

19 Claims, 8 Drawing Sheets

METHOD OF AND SYSTEM FOR PROVIDING POSITIONAL BASED OBJECT TO XML MAPPING

The present invention relates generally to computers and computer databases, and more specifically, to a method of and system for converting between Object-oriented classes and markup languages.

BACKGROUND OF THE INVENTION

Object-oriented software languages are an attempt to mirror the real world, in the sense that "physical" Objects are identified, and certain functionality is associated with each given Object. Software Objects are not easily portable, so it is common to convert software Objects to markup language code for transmission over the Internet, re-assembling the Objects when they are received. In fact, a number of protocols have been developed to support the communication of XML data over the Internet. It is therefore much easier to transmit database queries and structures, for example, over the Internet using XML (eXtensible Markup Language) code rather than Java Objects.

XML is a standard, software development language-independent text format for representing data. XML is a markup language in the same sense as Standard Generalized Markup Language (SGML), and Hyper Text Markup Language (HTML). This paradigm allows XML to facilitate communication between disparate systems—as long as all of the parties involved understand the particular XML model, the nature of the model itself is irrelevant and independent of the platforms involved.

This universal "understanding" of XML documents is facilitated by the use of XML schema. A set of syntax rules for XML elements shared by a group of XML documents is defined by an XML schema, which is an XML document itself. The syntax rules may, for example, indicate what elements can be used in a document, define the order in which they should appear, define which elements have attributes and what those attributes are, and identify any restrictions on the type of data or number of occurrences of an element. Schemas can be custom designed, though many schema are established by standards groups for general areas of application.

Two specific advantages of XML in the handling and transmission of Object-oriented software systems over Internet networks are:
1. Configuration: XML documents are a common way of storing configuration information—for example, EJB (Enterprise Java Beans) deployment descriptions and WSDL (Web Services Description Language) files that describe web services, are both in XML format. Object-XML conversion technologies allow a developer to interact with the data as recognizable domain Objects instead of having to use XML specific APIs and data structures; and
2. Persistence: It is easier to store XML documents than Objects. XML documents can either be stored directly to something like a file, to an EIS (Enterprise Integration Systems) data store that accepts XML records, or to an XML database.

Converting back and forth between XML and software Objects is not a trivial task. While XML represents data as a plain text document composed of a series of elements in a hierarchical format, software Objects in an Object-oriented application are composed of a complex set of data-types, pointers, application rules/methods, inheritance and relationships to other Objects. It is not surprising that the attempts at tools which can convert between software Objects and XML, have not been particularly effective. Two such families of tools include "Direct Converters" and "Code Generators":

Direct Converters

One family of Object-XML conversion tools are known as "direct converters". This family includes, for example: "XStream", the details of which may be found on the Internet at http://xstream.codehaus.org/ and "betwixt" which may be found at http://jakarta.apache.org/commons/betwixt/. These tools employ a fixed set of rules determining how an Object is converted to and from XML.

A first example of how an Object could be converted to an XML format using a direct converter is presented in FIG. 1. In this example the Class names and attribute names in the Java class become the element names in the resulting XML document (different direct converters may have different algorithms, but this is the general approach). The attribute "firstName" with value "Jane" in the Object 12, becomes a line of XML code in the XML document 14 reading "<firstName>Jane</firstName>". Similarly, the secondName attribute with value "Doe" becomes a line of XML code reading "<secondName>Doe</secondName>". The city and street data are similarly transposed from the Address Object to the XML document.

If the Object model is changed as shown in the second direct converter example, presented in FIG. 2, then a different XML document will be produced. In this case, the name of the "city" attribute of FIG. 1 has been changed to "town". This "town" attribute will be converted to a line of XML code reading <town>Some Town</town> rather than <city>Some Town</city> as in FIG. 1.

Using direct conversion tools, the XML document will reflect the structure of whatever Java Objects happen to arrive. Thus, there is no guarantee that an arriving document will conform to a given XML Schema.

In the third example of direct converters, presented in FIG. 3, the "city" attribute in the "Address" class was renamed to "town". If the XML document does not conform to the rules necessary to convert it to the Object then it cannot be converted using a direct conversion tool. A direct converter solution is only useful if you do not care how the XML data is formed—in this third example the "town" element cannot be converted to the "city" attribute in the "Address" class.

Generally, one does care how XML and Object data are transformed, so direct conversion techniques are of very limited usefulness.

Code Generators

A second family of Object-XML conversion tools is referred to as "code generated solutions". Code generated solutions take an XML Schema or some other XML document structure definition such as a DTD (document type definition) and produce an Object model from that. The advantage of this approach over data converters is that the resulting document will conform to the XML Schema. Two examples of "code generators" are JAXB which is described on the Internet at http://Java.sun.com/xml/jaxb/index.jsp, and BEA XML Beans which is described at http://dev2dev.bea.com/technologies/xmlbeans/index.jsp.

For example, assume that the following XML schema is given to generate an Object model:

```
<?xml version="1.0" encoding="UTF-8"?>
<xs:schema xmlns:xs="http://www.w3.org/2001/XMLSchema"
    elementFormDefault="qualified" attributeFormDefault="unqualified">
    <xs:element name="employee">
        <xs:complexType>
            <xs:sequence>
                <xs:element name="name" type="xs:string" minOccurs="2"
                    maxOccurs="2"/>
            </xs:sequence>
        </xs:complexType>
    </xs:element>
</xs:schema>
```

This schema includes the definition for an element called "name" that occurs twice in the document, code generation solutions will generate a class with a corresponding attribute that is a collection type (i.e. vector, array, list). In fact, code generated solutions do not allow any control over the nature of the Objects which are generated. Hence, code generation tools are useful when you care about the XML schema but not about the Object model.

"Code generator" Object to XML conversion tools can only infer very limited meaning on the structures that they encounter in the XML document. For example elements that occur more than once correspond to collection type attributes in the object mode. As well, the existing tools do not appreciate that some the position of XML elements may be significant. This results in a complicated, cumbersome Object structure which does not reflect what is desired or what is intuitive to the user.

A more powerful family of XML to Object conversion tools have been evolving, referred to as "mapping" tools. These tools allow the user to manually define how the XML and Objects are to be converted back and forth. However, the existing mapping tools are deficient in a number of ways.

In particular, these mapping tools (along with the direct converters and code generators which preceded them) convert between XML and Objects in a way that is independent of an XML element's position in the XML structure. Two examples are given below in which the position of an element in the XML structure carries significance. This significance is lost when the XML documents are converted to Objects:

EXAMPLE 1

Simple Values

In this example the first occurrence of "NAME" represents the customer's first name, and the second occurrence of "NAME" represents the customer's last name:

```
< CUSTOMER>
    <NAME>Jane</NAME>
    <NAME>Doe</NAME>
</CUSTOMER>
```

Existing mapping tools will only recognize the name of XML elements as being significant and store the simple values from elements with the same name in a collection. Hence, the generated Object will read:

name={"Jane", "Doe"}

This Object does not give any consideration to the ordering of the first and last names.

EXAMPLE 2

Object Values

In this example the first occurrence of "ADDRESS" represents the customer's billing address, and the second occurrence of "ADDRESS" represents the customer's shipping address:

```
<CUSTOMER>
    <ADDRESS>
        <STREET>123 Any Street</STREET>
        <CITY>Some Town</CITY>
        <PROVINCE>Ontario</PROVINCE>
        <POSTAL-CODE>A1B 2C3</POSTAL-CODE>
    </ADDRESS>
    <ADDRESS>
        <STREET>456 Another Road</STREET>
        <CITY>Some City</CITY>
        <PROVINCE>Ontario</PROVINCE>
        <POSTAL-CODE>D4E 5F6</POSTAL-CODE>
    </ADDRESS>
</CUSTOMER>
```

Existing mapping tools will only recognize the name of XML elements as being significant and store the simple values from elements with the same name in a collection. Hence, the generated Object will read:

address={anAddress, anAddress}

Code generators do not infer any significance on the position of an element either, because that type of information is not included in the schema.

It is therefore desirable to provide a method and system for converting data between Object-oriented classes and markup languages, which takes the position of elements in the XML documents into consideration. This solution should be provided with consideration for the problems described above.

SUMMARY OF THE INVENTION

It is therefore an object of the invention to provide a method and system which obviates or mitigates at least one of the disadvantages described above.

One aspect of the invention is broadly defined as a method of converting data from a markup language format to an Object model, comprising the steps of: identifying an input markup language document, a destination Object and a markup schema; determining mappings between the input markup language schema and the destination Object, including an indication of position for elements having the same name in the input markup language document; traversing the input markup language document; and instantiating corresponding software Objects with consideration for the position indication.

Another aspect of the invention is defined as a method for converting data in an Object model format to a markup language format, comprising the steps of: identifying an input Object, a destination markup language document, and a markup schema; determining mappings between the input Object and the destination markup language schema, including an indication of position for elements having the same name in the input markup language document; considering each software Object in the input Object, generating corresponding markup code and placing elements with like names in order determined by the position indication; and storing the generated markup language code in the destination markup language document.

BRIEF DESCRIPTION OF THE DRAWINGS

These and other features of the invention will become more apparent from the following description in which reference is made to the appended drawings in which.

DESCRIPTION OF THE INVENTION

The broad concept of the invention recognizes that the position of an XML element is significant and that the user should be able to uniquely map it to an attribute in their object model. Other approaches to XML to Object conversion ignore position and store simple values from elements with the same name in a collection.

The invention also recognizes that some XML elements contain data and others are used solely to organize data. This allows the user to maintain a well-structured document without having to produce additional Objects. Other conversion tools cannot distinguish between data elements and organizational elements, and require that an Object be created for each level of nesting. For example, a code generator cannot infer which elements contain relevant content versus elements that are used solely to organize data, since that type of information is not stored in the XML schema. The invention provides the user with the ability to customize mappings taking XML position and structure into consideration. Elements in an XML document are not required to be uniquely identified by name, instead it is a combination of name and position that represent what a node means.

Figure 1:
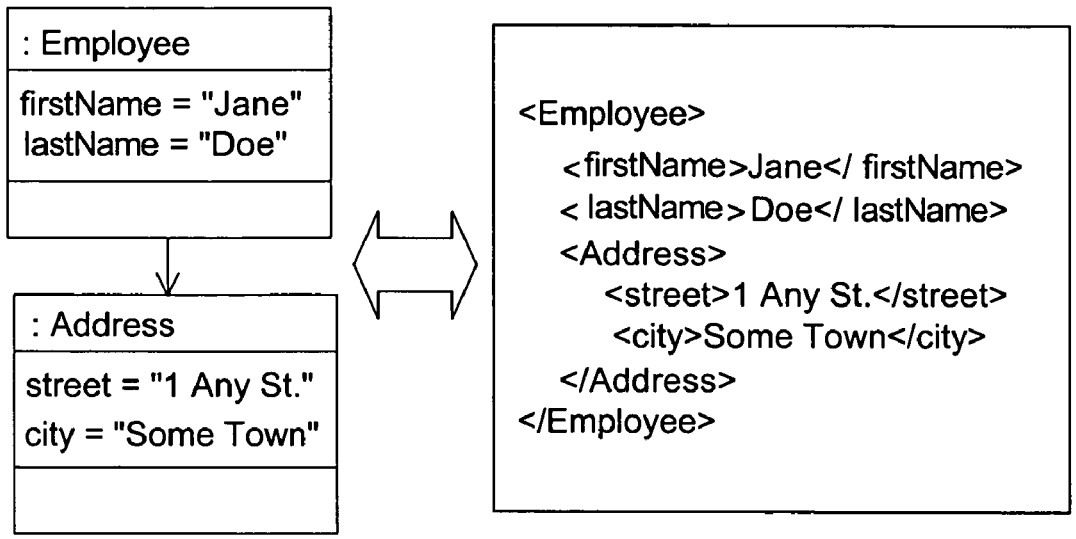
FIG. 1 presents a block diagram of a first exemplary conversion between software Objects and an XML document using a direct converter, as known in the art.
Figure 2:
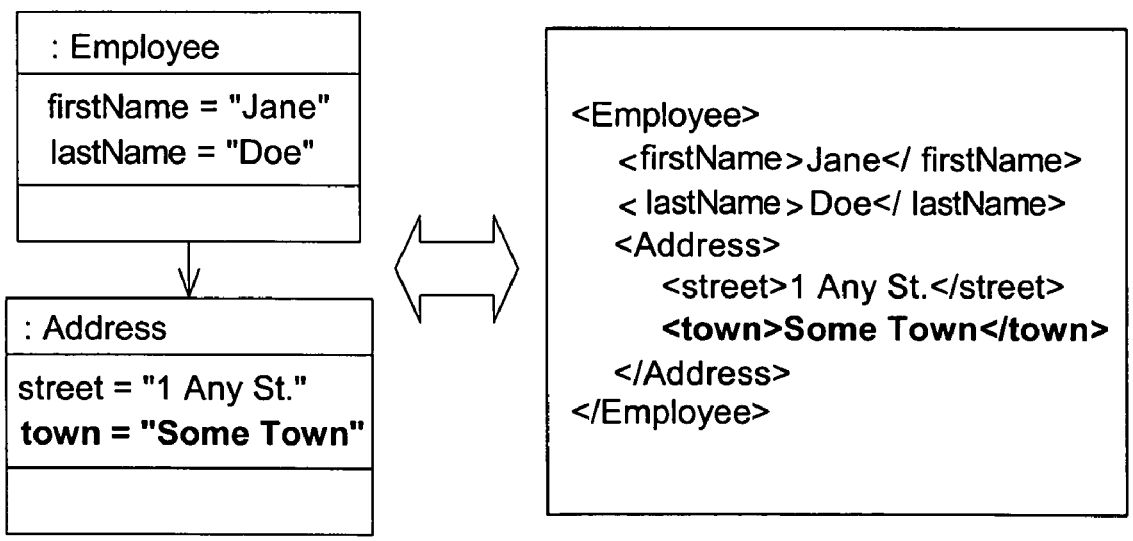
FIG. 2 presents a block diagram of a second exemplary conversion between software Objects and an XML document using a direct converter, as known in the art.
Figure 3:
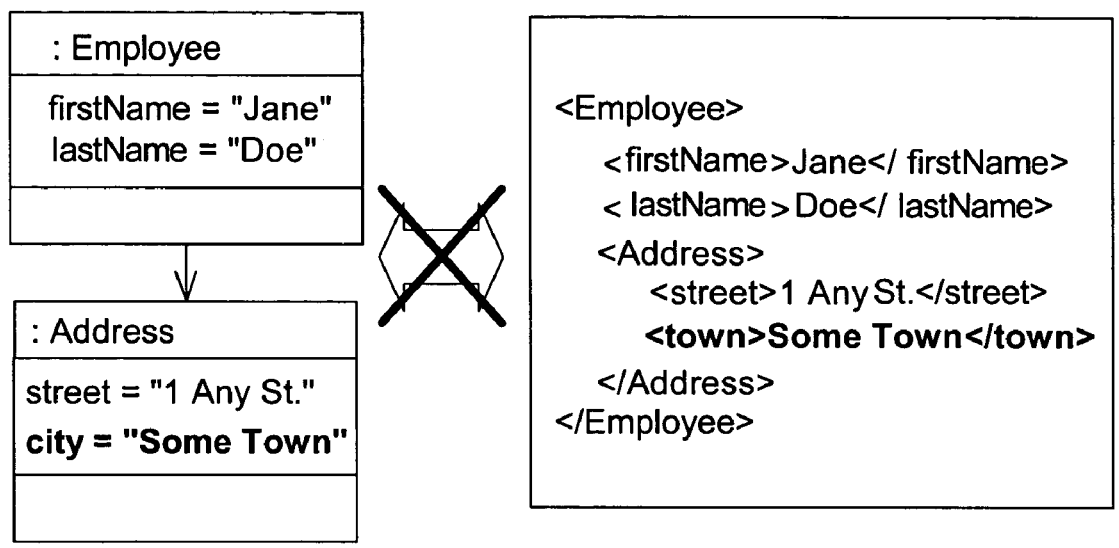
FIG. 3 presents a block diagram of a third exemplary conversion between software Objects and an XML document using a direct converter, as known in the art.
Figure 4:
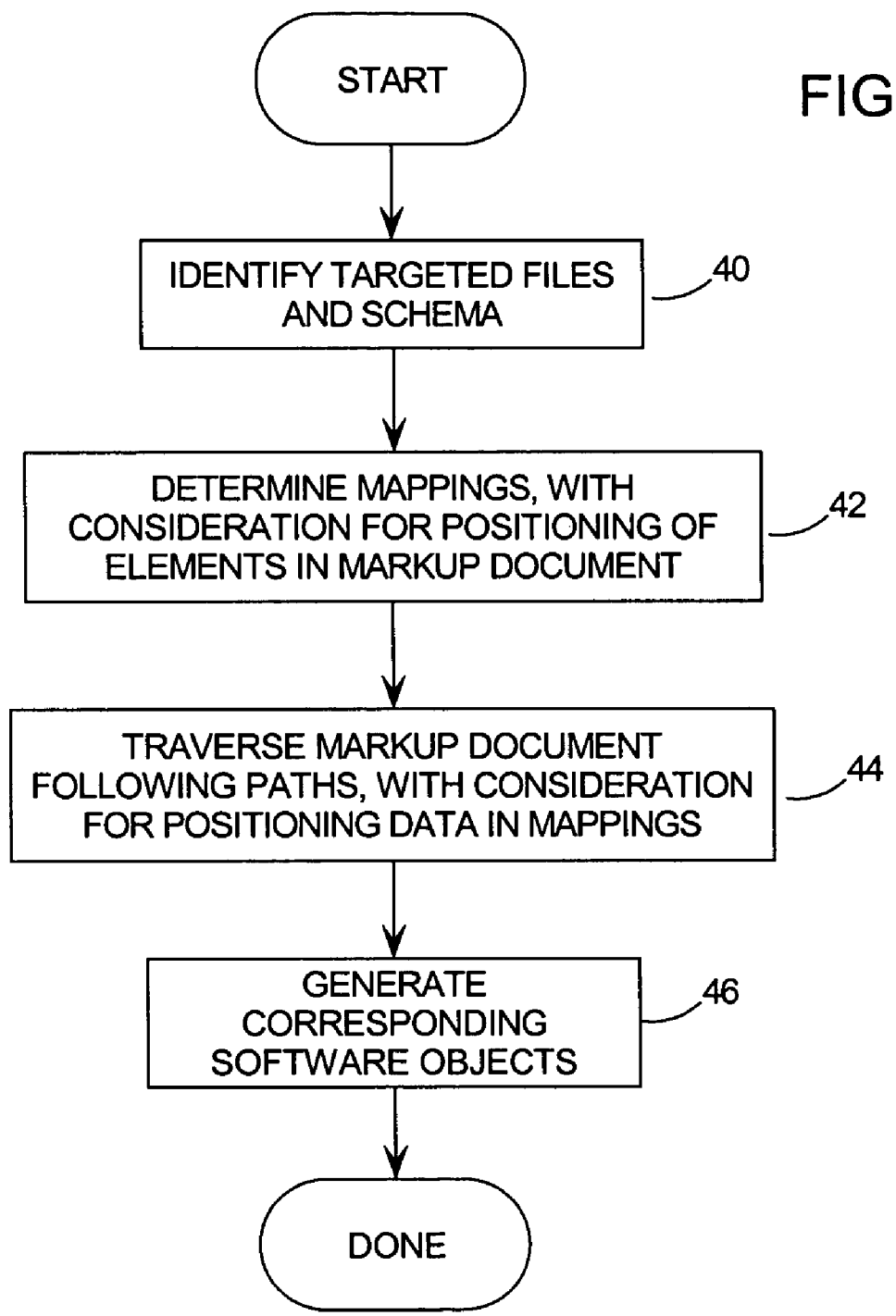
FIG. 4 presents a flow chart of a method of conversion between a markup language document and an Object, in a broad embodiment of the invention.
Figure 5:
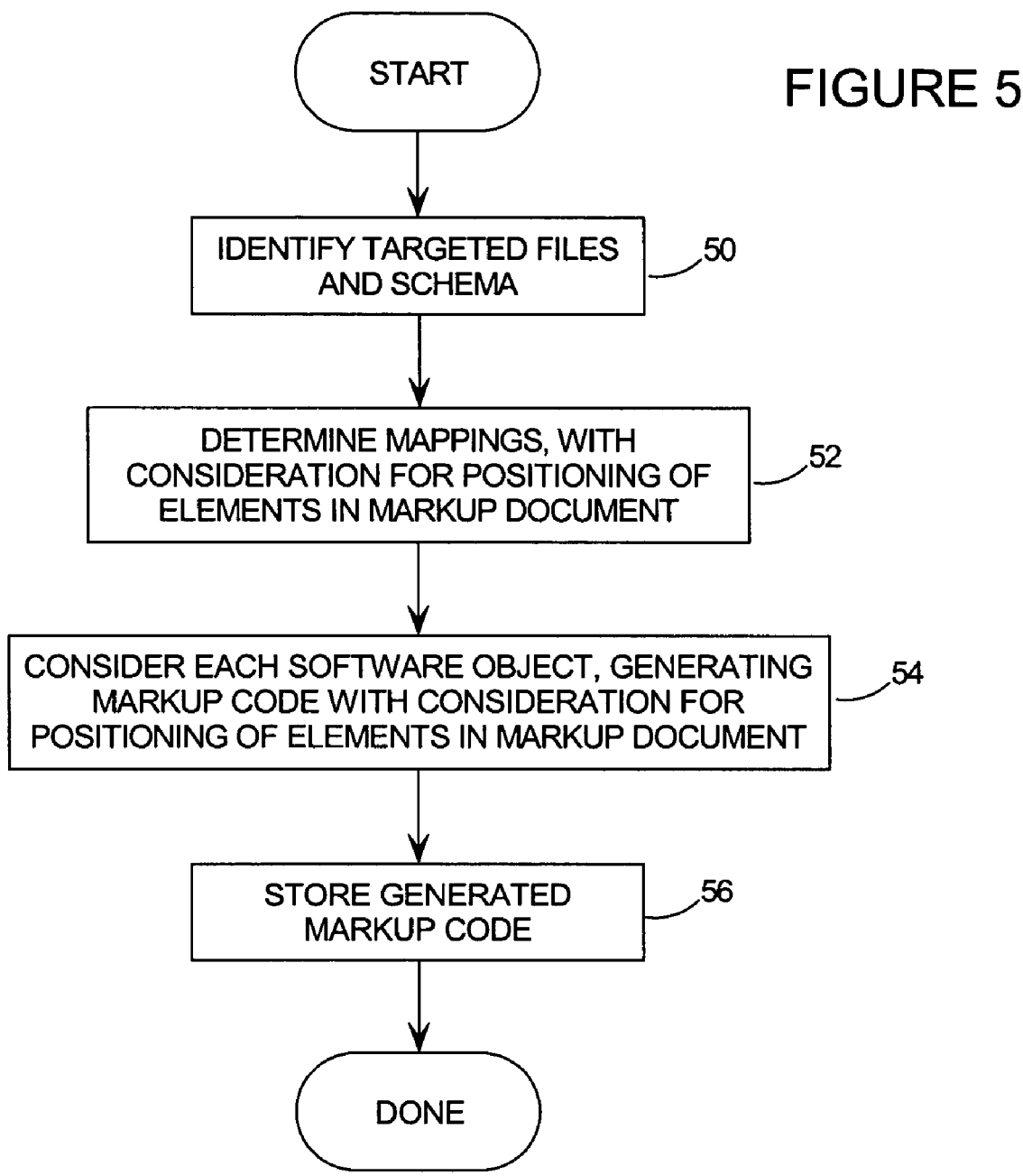
FIG. 5 presents a flow chart of a method of conversion between an Object and a markup language document, in a broad embodiment of the invention.

Methodologies which broadly address the Objects outlined above, are presented as flow charts in FIGS. 4 and 5. FIG. 4 presents a flow chart of markup language to software Object conversion, while FIG. 5 presents a flow chart of complementary Object to markup language conversion. Markup language documents include elements that are defined by tags, labels or similar indicators. The method of the invention is generally described with respect to XML, but could apply to any mark up language including XML, Standard Generalized Markup Language (SGML), Hyper Text Markup Language (HTML), and Extensible HTML (XHTML). The invention could also be applied to other mark up languages which may evolve over time.

Similarly, the invention is generally described with respect to Java, but could apply to any Object-oriented language. Common Object-oriented software languages include C++, Eiffel™, Smalltalk™ and Java™. Of these, Java is the most widely used, particularly in Internet-based applications.

XML documents have both a logical and a physical structure. Logically, the XML document is composed of declarations, elements, comments, character references, and processing instructions. The elements can contain text and other elements. Attributes in XML provide additional information regarding an element.

An Object model, such as Java, contains one or more Object classes. An Object class contains attributes, relationships and/or methods. The attributes store primitive data such as integers, and also store simple types, such as String and Date. Relationships are references to other classes, while methods are paths of query execution.

The process of converting a markup language document to Object format is presented in the flow chart of FIG. 4. To begin with, the targeted files and mark up schema must be identified at step 40. This could occur in a number of ways, depending on the application. For example, a response to a database query could arrive at a client computer in a markup language format. This query would also include a schema with it or make reference to a known schema.

At step 42, mappings between the received markup language document and the desired Object output file are determined, generally by correlating the schema to the Object(s). This step could also be performed in a number of ways, for example, using a graphic user interface such as the Oracle TopLink Mapping Workbench (additional details are available in the related co-pending patent applications titled "Method and System for Mapping Between Markup Language Documents and an Object Model", filed on Aug. 1, 2001, under U.S. patent application Ser. No. 09/920,786, "Method of and System for Providing Path Based Object to XML Mapping", filed on Jun. 8, 2004, under U.S. patent application Ser. No. 10/864,790, and "Method of and System for Providing Namespace Based Object to XML Mapping", filed on Jun. 8, 2004, under U.S. patent application Ser. No. 10/864,791, all of which are incorporated herein by reference). Alternatively, mappings could be established manually or in advance by a third party such as a standards group or a software supplier.

If, for example, an XML document with the following structure is being considered:

```
<CUSTOMER>
    <NAME>Jane</NAME>
    <NAME>Doe</NAME>
</CUSTOMER>
``` then the user will probably wish to map the first instance of the "name" element onto a "firstName" attribute in their Object, and the second instance of the "name" element onto a "secondName" attribute in their Object.

In many applications of the invention, either standard schemas will be used or a vast number of markup documents will be handled, all of which use the same schema. In either case, it would be efficient to generate a mapping paradigm and store that paradigm for regular and multiple uses. The mapping paradigm could be transmitted to other users or even stored on CD-ROMs and distributed as part of a software application.

At step 44, the method of the invention simply traverses the markup language document, collecting data and text for the generation of software Objects at step 46. Step 44 could be performed in its entirety before step 46 is performed, or the two steps could be performed repeatedly for each of the elements of the markup language document. Alternatively, logical portions of the markup language document could be processed one block at a time. The manner in which these steps are performed is not significant in the context of the broad invention. What is important though, is that the process of traversing the markup language document at step 44 take into consideration the positional data for a given markup language element. Once all of the software Objects have been instantiated, the Objects can be processed in whatever manner the software application dictates. In the case of a database system, for example, this may consist of simply executing the received query (in the case of a server receiving the packet), or reading the received response (in the case of a client computer).

Note that if multiple conversions are being made, it may only be necessary to perform steps 40 and 42 once, as part of a set-up routine. Steps 44 and 46 can then be performed multiple times thereafter, as part of a runtime routine.

The complementary process of converting software Objects to a mark up language format is presented in the flow chart of FIG. 5.

Like the method of FIG. 4, the process begins with the identification of the targeted documents and markup language schema at step 50. In this case, however, the main input being received will be an Object, rather than a markup language document.

In the typical application of software Objects being used on computers and servers, with corresponding markup language documents being generated for transmission, this routine would be launched in response to a desire to transmit a query or a response. Hence, all of the information required to perform this routine would typically be local to the computer or server generating the markup language document.

Control then passes to step 52, where mappings between the software Object and the desired output markup language schema are determined. This step would be performed in much the same manner as step 42 above, i.e. using a graphic user interface (GUI), manual manipulation or pre-determined.

At step 54, the algorithm simply considers each of the software Objects, one at a time, generating corresponding markup language code. This would be done generally in the manner known in the art except that the mapping data is used to determine the position of the generated markup language code in the rest of the markup language document. The manner is which this is done will be clear from the examples which are described hereinafter.

The generated markup language document is then stored at step 56 so it can be processed or transmitted as required. As in the case of the method of FIG. 4, steps 54 and 56 can be done one Object at a time, block by block, or completed in their entirety before continuing with the next step. As well, steps 50 and 52 could be performed a single time, while steps 54 and 56 are performed multiple times (for multiple Objects). The manner in which these steps are performed is not significant in the context of the broad invention.

Figure 6:
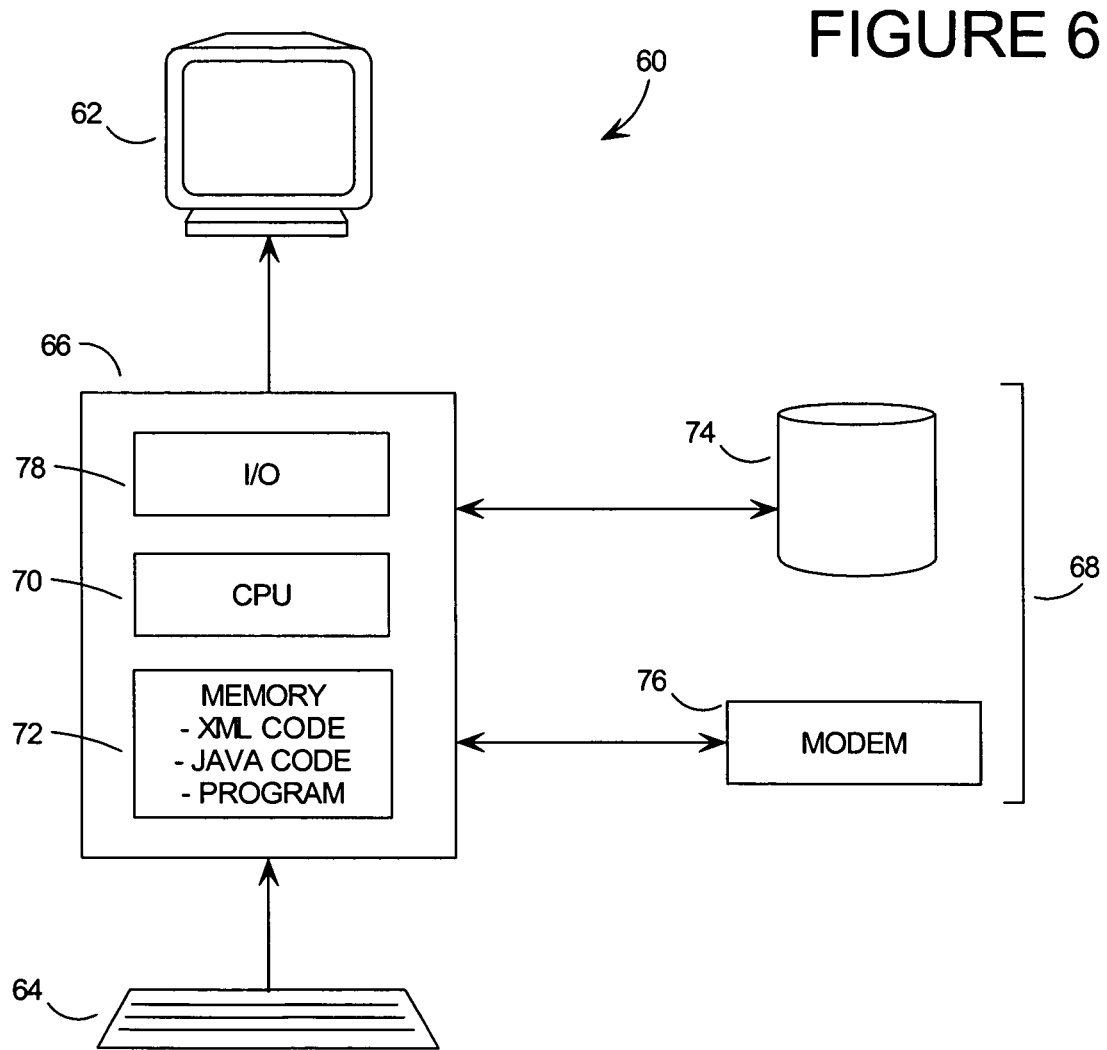
FIG. 6 presents a block diagram of an exemplary computer system on which the methods of the invention could be implemented.

An example of a system upon which the invention may be performed is presented as a block diagram in FIG. 6. This computer system 60 includes a display 62, keyboard 64, computer 66 and external devices 68.

The computer 66 may contain one or more processors or microprocessors, such as a central processing unit (CPU) 70. The CPU 70 performs arithmetic calculations and control functions to execute software stored in an internal memory 72, preferably random access memory (RAM) and/or read only memory (ROM), and possibly additional memory 74. The additional memory 74 may include, for example, mass memory storage, hard disk drives, floppy disk drives, magnetic tape drives, compact disk drives, program cartridges and cartridge interfaces such as that found in video game devices, removable memory chips such as EPROM, or PROM, or similar storage media as known in the art. This additional memory 74 may be physically internal to the computer 66, or external as shown in FIG. 6.

The computer system 60 may also include other means for allowing computer programs or other instructions to be loaded. Such means can include, for example, a communications interface 76 which allows software and data to be transferred between the computer system 60 and external systems. Examples of communications interface 76 can include a modem, a network interface such as an Ethernet card, a serial or parallel communications port. Software and data transferred via communications interface 76 are in the form of signals which can be electronic, electromagnetic, optical or other signals capable of being received by communications interface 76.

Input and output to and from the computer 66 is administered by the input/output (I/O) interface 78. This I/O interface 78 administers control of the display 62, keyboard 64, external devices 68 and other such components of the computer system 60.

The invention is described in these terms for convenience purposes only. It would be clear to one skilled in the art that the invention may be applied to other computer or control systems 60. Such systems would include all manner of appliances having computer or processor control including telephones, cellular telephones, televisions, television set top units, lap top computers, personal digital assistants and automobile telematic systems.

The majority of Object-to-XML technologies are based on generating Java code from XML schemas. A code generator cannot infer the meaning of an element based on its position, since that type of information is not stored in the schema. Since the invention provides the user with the ability to customize mappings, it can provide capabilities beyond what a code generation tool is capable of. Any application developer using an Object oriented computer language to interact with XML would likely be very interested in the capabilities of this invention.

Further advantages are clear from the detailed description of the invention which follows.

DETAILED DESCRIPTION OF PREFERRED EMBODIMENTS OF THE INVENTION

Figure 7:
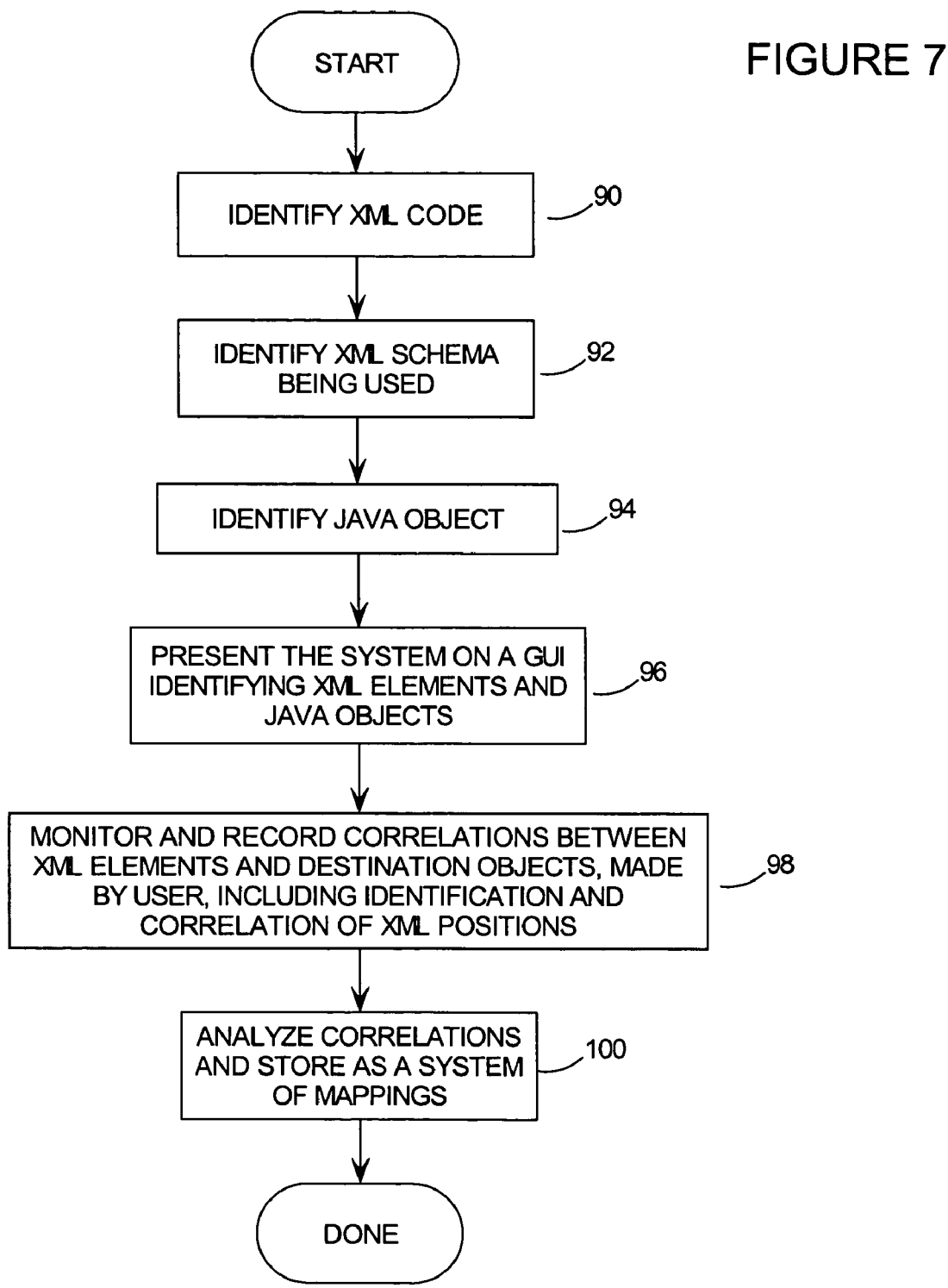
FIG. 7 presents a flow chart of a method of set-up for conversion of data between XML and Object formats, in an embodiment of the invention.
Figure 8:
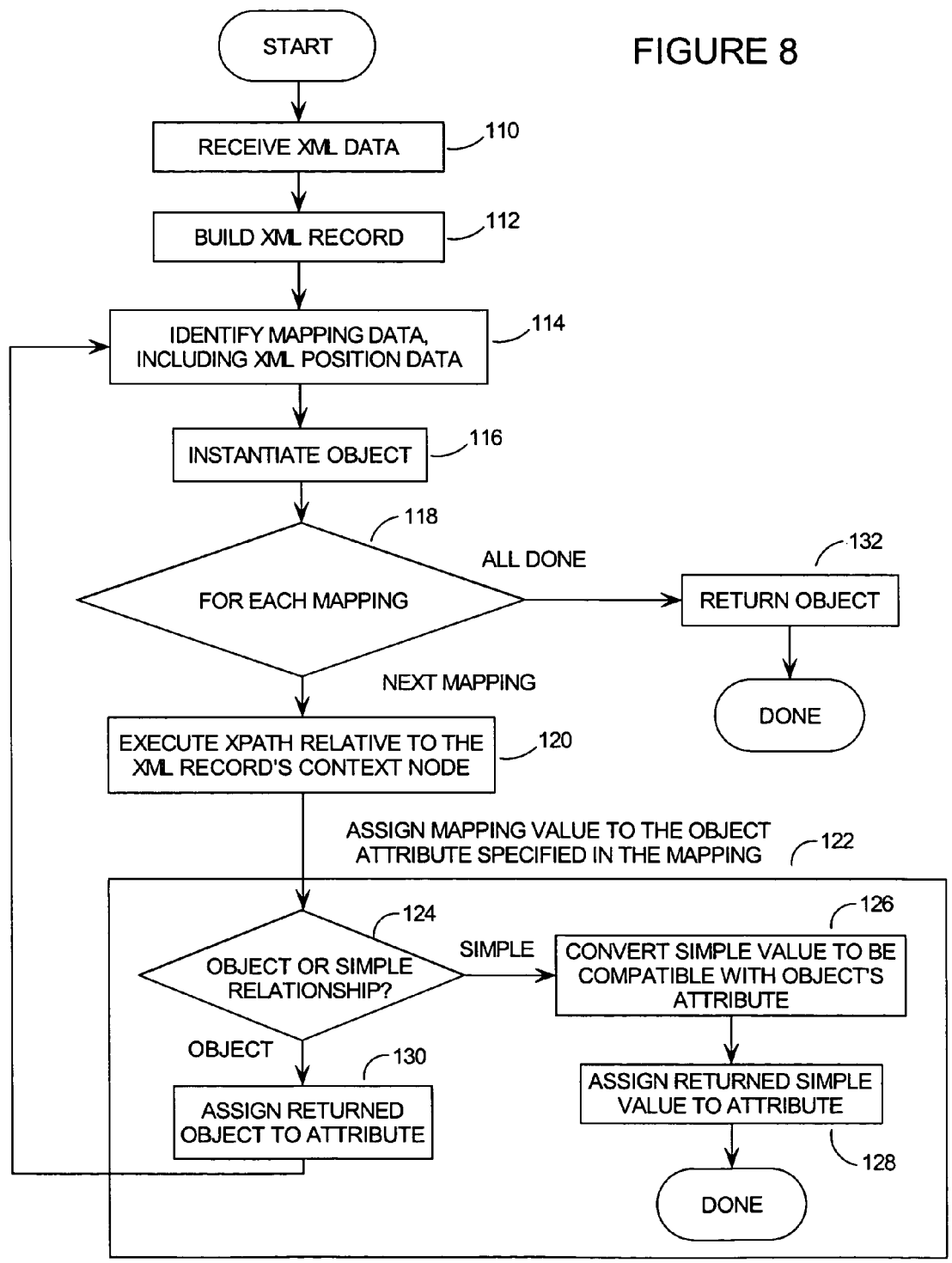
FIG. 8 presents a flow chart of a method of run-time for conversion of data from XML format to Object format, in an embodiment of the invention.
Figure 9:
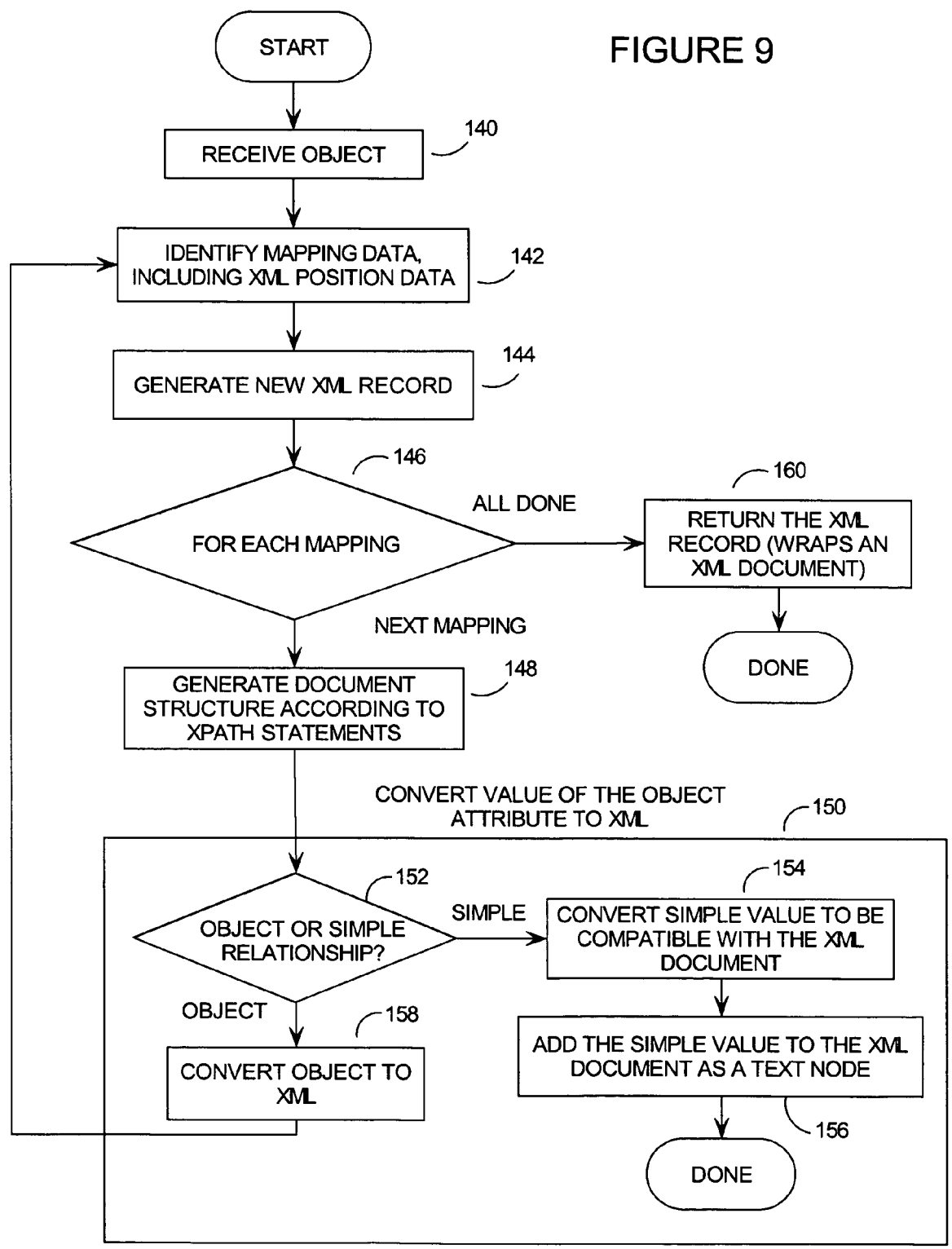
FIG. 9 presents a flow chart of a method of run-time for conversion of data from Object format to XML format in an embodiment of the invention.

The preferred embodiment of the invention is presented by means of the flow charts of FIGS. 7, 8 and 9, and the descriptions of the examples which follow.

In general, the XML to Object conversion methodology of the invention is effected in two stages: the set-up stage and the run-time stage. The routine for the set-up stage is presented in the flow chart of FIG. 7. The set-up stage is common to both XML-to-Java conversion, and Java-to-XML conversion, though the data available to the user is usually different.

To begin with, the files being dealt with must be identified. Specifically, the target XML document is identified at step 90, the XML schema being used is identified at step 92 and the target Java file identified at step 94.

The system is then presented to the user via a graphical user interface (GUI) at step 96, which presents the XML elements defined by the schema and the destination Objects defined by Java class files. The GUI also allows the user to define how the two systems correlate. Suitable tools are known in the art for establishing such mappings, such as the Oracle TopLink Mapping Workbench. The necessary modifications to such a tool (or a similar tool) required to effect the invention would be clear to one skilled in the art from the teachings herein. Other mapping tools, of course, could also be used.

Particular to the invention is the functionality to map positional information from an XML document to an Object. This is accomplished by:
1. presenting the positional context of the XML elements in the XML document to the user via the GUI,
2. allowing elements in different positions to be identified and correlated to Objects independently of one another, and
3. including a field in the mapping data (i.e. the metadata for the node), which includes positional data.

The user is then able to establish correlations and relationships at step 98 which are analyzed and stored as a system of mappings at step 100. These mappings are referred to herein as the "metadata" for a given node. As part of this analysis, the algorithm records the Java Object attribute, and the path through the XML structure, including a numeric identifier representing the position of the XML element in the XML document. Further details are described hereinafter, particularly with respect to Example 3.

It is also desirable to allow the user to identify lines of XML code by their name and position, as this provides the user with much greater control over the structure of the system. Other Object-to-XML technologies require an element that occurs more than once be converted to a collection type attribute. Hence, they place restrictions on the object model. In contrast, the invention recognizes that it is not necessary (or even desirable) to always force this type of conversion—the invention allows one to define mappings which convert XML structure and data that are based on both name and position.

For example, the metadata for a simple element might read as follows (note that the "mapping type" indicates whether the node is a simple element or an object element): lastName Mapping
Mapping Type: Direct Mapping
Object Attribute: lastName
XPath: name[2]/text( )

while the metadata for an object element might read:
shippingAddress Mapping
Mapping Type: Composite Object Mapping
Object Attribute: address
XPath: address[2]

This completes the "set-up" phase of the process. Note that set-up could be effected at any time prior to a run-time stage.

The methodology of the run-time stage for converting an XML document to a Java class representation is presented in the flow diagram of FIG. 8.

This methodology is generally initiated when an XML document or markup data of some sort is received by the program at step 110, and it is determined that this XML document must be converted from XML format to a Java representation. Of course, it is not necessary that an entire XML document be received—a short piece of XML code or a portion of a larger document is sufficient.

Conversion of an XML document generally consists of stepping through the XML document, considering each line, and determining via the mapping data, how it is to be realized in the Java code. Before starting this process, the program first walks through the XML file at step 112 and builds XML records by parsing the XML data into a more accessible form using DOM or SAX.

DOM (Document Object Model) is a known applications programming interface which parses XML documents into a tree structure of elements and attributes, so they can be analysed and manipulated. DOM also provides access to the structure through a set of Objects which provided well-known interfaces.

Another parser which could be used to perform this step is SAX (Simple API for XML). SAX parsers only produce a series of parse events, while DOM parsers produce a complete parse tree representation of the data.

While SAX and DOM provide standard mechanisms for reading XML documents, they work at a low level. To use DOM as a manual tool, for example, would require the developer to have a detailed understanding of how to use the API to navigate nodes, elements, attributes, and to extract textual content and then convert the text to useful program data types. This process would be tedious and error prone.

Then, at step 114, the mapping data associated with the XML record is identified. This mapping data would have been generated using the algorithm of FIG. 7, and will correlate the received XML data with the desired Java output object. As noted above, this mapping data is referred to as "metadata" for the node. The metadata includes information regarding the position of the XML node being considered, and drives the iterations and data populating that must be performed for the node at steps 116-130.

As shown below with respect to Example 3, occurrences of multiple lines of XML with the same name, will generate mapping data which results in distinct and separate Objects. For example, two occurrences of elements called "name" may result in the following mapping data:
1. Name of the object attribute: firstName Location of XML data: NAME[1]/text( )
2. Name of the object attribute: lastName Location of XML data: NAME[2]/text( )

Hence, the occurrence of two elements with the same name is easily handled during the XML to Object conversion stage. The two elements are considered to be different nodes, and they generate two different Objects—firstName and lastName.

The metadata indicates what Java Object is required, and that Object is to be instantiated at step 116. As part of this exercise, a query is made to determine the field descriptors of the Object so they can be populated with data. A corresponding Java object is then instantiated at step 116.

The program then uses the loop 118 to walk through each mapping related to the targeted XML code, the tree performing steps 120-130 for each mapping. The loop starts at the desired entry point in the SAX tree which could be the root, but does not have to be. Generally, the tree would be traversed from the start node down.

For each mapping, the algorithm executes an XPath query at step 120 to collect data relative to the current XML record. XPath queries are used to specify locations in XML trees, and to collect information from those locations. As noted above, XML documents are highly structured and can be considered as trees of nodes. XPath queries are written using paths through those trees of nodes.

For example, in a XML document containing lists of CDs, such as this:

```
<catalog>
    <cd>
        <title>Christmas Songs</title>
        <artist>The Rockers</artist>
        <price>10.90</price>
        <year>1985</year>
    </cd>
    <cd>
        <title>Boring Songs</title>
        <artist>Slim Sam</artist>
        <price>9.90</price>
        <year>1988</year>
    </cd>
    .
</catalog>
``` an XPath query "catalog/cd/price" will select all of the price nodes from the XML document. Other more elaborate queries may be made using different tests (for example, identifying nodes with values greater than or less than a certain amount), or varying the paths (wildcards, for example, may be used in the paths, such as "catalog/*/price"). These variations would be known to one skilled in the art.

The XPath queries are used to collect the data needed to affect the desired mapping. Once this data has been collected, the corresponding Java Object or Objects can be populated with data per subroutine 122.

Subroutine 122 populates the Java Object(s) differently depending on whether the XML data defines structure (an object relationship) or data (a simple relationship). The nature of the XML data is determined at step 124 simply by checking the "Mapping Type" field of the metadata for the node (see Example 1 for additional details). If the metadata indicates that the XML node is "simple", then the routine passes control to step 126 where the simple XML data is converted to be compatible with the Java Object's attribute. The simple XML data is then assigned to the attribute at step 128, and the routine is complete for this node.

If the metadata indicates that the XML node is a structural object, then the routine assigns that returned object to the Object attribute at step 130, and control returns to step 118 so that additional mappings can be considered. These additional mappings will consist of lower levels of XML data. Steps 116 through 130 are repeated for each successive lower level of XML data.

Once it has been determined at step 118 that all of the mappings have been considered, the routine passes control to step 132, where the completed instance of the Java Object is returned so it can be processed as required. In the event that the XML document is a database query, for example, the Object file is then executed so that the database query can be made. If additional XML elements must be converted (i.e. there are additional nodes in the SAX tree), then control passes to step 120, where the next node is considered.

In short, when an XML document is being converted to Object data each of the mappings is processed for each of the Objects mapped attributes. For elements with like names, a numeric tag is placed in the metadata indicating the specific position of the element in the XML. From the perspective of the Object data, nothing outstanding is occurring because the metadata includes separate and distinct identifiers for these nodes, even though they had the same XML name.

FIG. 9 depicts a flow diagram of a method for converting a Java class into an XML representation. This method is complementary to that of FIG. 8, and requires that the same set-up routine of FIG. 7 be performed ahead of time.

As in the case of the XML to Object conversion, this routine responds to a request to convert all or a portion of a targeted Object file to XML format. To begin with, an Object is received at step 140, and the corresponding mapping data is identified at step 142. As noted above, the mapping data (or metadata) developed during the set-up routine of FIG. 7, can be used.

The routine then generates a new XML record corresponding to the mapping, at step 144, and walks through the received Object file, considering one Object at a time, using the control loop through step 146. For each Object that is encountered, XML document structure is generated at step 148, according to the XPath data for the current mapping. Control then passes to subroutine 150.

The subroutine first determines whether a given node is a simple node or an object node (defining XML structure), at step 152. If the node is a simple node, then control passes to step 154 where the simple value is converted to be compatible with the XML document, and the data is subsequently added to the XML document as a text node in step 156. If the node is determined to be an object node at step 152, then the object is converted to XML at step 158, and control passes back to step 142 to iterate over lower levels of Objects.

As noted above, the metadata for a node identifies the XML name and XPath. It also indicates whether a particular node has an XML name that it shares with another node, and if it does, the metadata indicates the numerical order (or "position") of those like-named elements within the XML document. Thus, as part steps 154 and 156, it may be necessary to rationalize and/or verify the ordering of those lines of XML code.

Once it has been determined at step 146 that all of the mappings have been considered, control passes to step 160 where the XML record is returned and is processed as required. Generally, XML files are generated so that they can be transmitted, so step 160 will typically consist of transmitting the completed XML file to a remote server as a database query.

The only complication with the algorithm of FIG. 9 is in the generation of the appropriate XML structure at step 152. The metadata for a node will include the desired XPath data, as determined by the user during the set-up stage. The details of how this is done are clear from examples which follow.

EXAMPLE 3

General Mapping

In the background above, with respect to Examples 1 and 2, the following XML system was given:

```
<CUSTOMER>
    <NAME>Jane</NAME>
    <NAME>Doe</NAME>
    <ADDRESS>
        <STREET>123 Any Street</STREET>
        <CITY>Some Town</CITY>
        <PROVINCE>Ontario</PROVINCE>
        <POSTAL-CODE>A1B 2C3</POSTAL-CODE>
    </ADDRESS>
    <ADDRESS>
        <STREET>456 Another Road</STREET>
        <CITY>Some City</CITY>
        <PROVINCE>Ontario</PROVINCE>
        <POSTAL-CODE>D4E 5F6</POSTAL-CODE>
    </ADDRESS>
</CUSTOMER>
``` where the first occurrence of the "NAME" element refers to the given name of the customer, while the second occurrence refers to the family name. Similarly, the first occurrence of "ADDRESS" represents the customer's billing address, and the second occurrence of "ADDRESS" represents the customer's shipping address. Hence, the metadata for these elements will reflect these intentions.

Note that a mapping has been generated for each software Object, and that each mapping includes: a mapping type which determines whether the XML element is intended to contain data or define structure, an Object attribute and an XPath which locates the destination in the XML document. The "address mapping" element is a complex element (i.e. it defines structure rather than data), so it has a "reference descriptor" which directs the program to the "street Mapping" and "city Mapping" data:

firstName Mapping
Mapping Type: direct mapping
Object Attribute: firstName
XPath: NAME[1]/text( )
lastName Mapping
Mapping Type: direct mapping
Object Attribute: lastName
XPath: NAME[2]/text( )
addressBilling Mapping
Mapping Type: composite Object mapping
Object Attribute: addressBilling
XPath: ADDRESS[1]
Reference Descriptor: Address
addressShipping Mapping
Mapping Type: composite Object mapping
Object Attribute: addressshipping
XPath: ADDRESS[2]
Reference Descriptor: Address The set of mapping data will also contain a mapping for each Address attribute that will be converted to XML (note that a similar set of metadata would also be generated for the shipping address):

Address Descriptor
street Mapping
   Mapping Type: direct mapping
   Object Attribute: street
   XPath: STREET/text( )
city Mapping
   Mapping Type: direct mapping
   Object Attribute: city
   XPath: CITY/text( )
province Mapping
   Mapping Type: direct mapping
   Object Attribute: province
   XPath: STREET/text( )
postalCode Mapping
   Mapping Type: direct mapping
   Object Attribute: postalCode
   XPath: POSTAL-CODE/text( )

EXAMPLE 4

Simple Values—XML to Object Conversion

In the example below the first occurrence of "NAME" represents the customer's first name, and the second occurrence of "NAME" represents the customer's last name. This will be realized in the metadata as follows:

firstName Mapping
Mapping Type: direct mapping
Object Attribute: firstName
XPath: NAME[1]/text( )
lastName Mapping
Mapping Type: direct mapping
Object Attribute: lastName
XPath: NAME[2]/text( )

When an XML document is being converted to object data each of the mappings is processed for each of the objects mapped attributes. The XPath statement used to specify the location of the XML data is executed and the resulting XML data is passed to the mapping to be converted to object data, which is set on the object. Thus, the input XML code:

```
<CUSTOMER>
    <NAME>Jane</NAME>
    <NAME>Doe</NAME>
</CUSTOMER>
``` will be converted to:
   Customer (firstName="Jane", lastName="Doe")

EXAMPLE 5

Simple Values—Object to XML Conversion

The complement to Example 4, is the conversion from Object format to XML. This would proceed along the following lines, the Object source:
   Customer (firstName="Jane", lastName="Doe")

being converted to:

```
<CUSTOMER>
    <NAME>Jane</NAME>
    <NAME>Doe</NAME>
</CUSTOMER>
```

This occurs because the node metadata dictated that the firstName and lastName Objects should map onto XML elements with the same name, where the first name takes a position ahead of the second.

EXAMPLE 6

Object Values—XML to Object Conversion

As noted above, object elements are XML elements which include structure rather than data. If there are two object elements in an XML document with the same name, the metadata must identify them separately and given them separate identifiers in order to result in separate objects.

Thus, if the metadata described under Example 3 above is used for the following XML document:

```
<CUSTOMER>
    <ADDRESS>
        <STREET>123 Any Street</STREET>
        <CITY>Some Town</CITY>
        <PROVINCE>Ontario</PROVINCE>
        <POSTAL-CODE>A1B 2C3</POSTAL-CODE>
    </ADDRESS>
    <ADDRESS>
        <STREET>456 Another Road</STREET>
        <CITY>Some City</CITY>
```

```
        <PROVINCE>Ontario</PROVINCE>
        <POSTAL-CODE>D4E 5F6</POSTAL-CODE>
    </ADDRESS>
</CUSTOMER>
``` then the result will be:

Customer (billingAddress=anAddress, shippingAddress=anAddress)

EXAMPLE 7

Object Values—Object to XML Conversion

The converse to Example 6, is the conversion of Object code to an XML document. This will proceed as follows. Note that when a path based mapping is processed it will create elements missing from the path if they are not present in the document.

Thus, given Object code such as:

Customer (billingAddress=anAddress, shippingAddress=anAddress)

and mapping data as shown above with respect to Example 3, the routine of the invention will generate the following code:

```
<CUSTOMER>
    <ADDRESS>
        <STREET>123 Any Street</STREET>
        <CITY>Some Town</CITY>
        <PROVINCE>Ontario</PROVINCE>
        <POSTAL-CODE>A1B 2C3</POSTAL-CODE>
    </ADDRESS>
    <ADDRESS>
        <STREET>456 Another Road</STREET>
        <CITY>Some City</CITY>
        <PROVINCE>Ontario</PROVINCE>
        <POSTAL-CODE>D4E 5F6</POSTAL-CODE>
    </ADDRESS>
</CUSTOMER>
```

Other Options and Alternatives

The invention is not limited by the nature of the communication network or the underlying computer system to which it is applied. The invention could be applied over any computer network or computer system, using any manner of platform. Client computers may be any form of interface to the system including for example, a desktop or laptop computer, smart terminal, personal digital assistant (PDA), point of sale computer, information kiosk, Internet-ready telephone or other similar wireless or hard-wired interface known in the art.

The communications between the components in the system may be done over any communication network known in the art, and may consist of several different networks working together. These networks may include for example, wireless networks such as cellular telephone networks, the public switched telephone network, cable television networks, the Internet, ATM networks, frame relay networks, local area networks (LANs) and wide area networks (WANs). The client computers may, for example, access the system via an Internet Service Provider (ISP) using a cable modem, telephone line mode, or wireless connection. The invention is not limited by the nature of any of these communication networks.

It would be clear to one skilled in the art, how to implement these and other variations in view of the description of the invention herein.

Conclusions

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as Object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

What is claimed is:

1. A computer implemented method for generating an Object usable in an object-oriented code from a markup language code, comprising the steps of:

identifying an XML input markup language code, a destination Object which is used in an object-oriented code, and a markup schema;

determining mappings between elements of said input markup language schema and attributes of said destination Object, wherein determining the mappings involves:

generating a different attribute of the destination Object from each of the elements having the same name but different positions in said input XML markup language code, wherein the Object attribute explicitly declares the meaning of the associated element implied by the associated position in the XML markup language code, wherein the associated position is based on a sequential order of occurrences of the elements having the same name; and generating mapping metadata which defines how the data architecture of the XML markup language code maps to an Object model corresponding to the destination Object;

traversing said input XML markup language code; and instantiating the destination Object which includes different Object attributes generated from elements in the input XML markup language code with the same name but different positions;

wherein determining mappings comprises allowing a user to establish relationships between said destination Object and XML markup schema using a graphic user interface.

2. The method of claim 1, wherein said step of traversing comprises the step of: parsing said markup language code to build a tree of nodes.

3. The method of claim 2, wherein said step of traversing comprises the step of:

for each node in said tree of nodes, reading the metadata for each said node.

4. The method of claim 2, wherein said step of traversing comprises the step of:
for each node in said tree of nodes, generating an Object corresponding to each said node, populating attributes of said generated Object with the data of the elements based on the mapping metadata.

5. The method of claim 1, wherein said step of traversing comprises the step of:
for each node in said tree of nodes, collecting data for each said node by performing an XPath query.

6. The method of claim 1 wherein said markup language code has one or more elements containing data, said Object model has one or more Object classes, each Object class having one or more attributes, and said mapping data comprises a name of an Object attribute and a location of corresponding XML data.

7. The method of claim 1 wherein said software Objects comprise platform-independent Objects.

8. The method of claim 2 wherein said step of identifying said input markup language code comprises the step of receiving a request in a markup language format.

9. The method of claim 2, wherein said step of collecting data comprises the step of iterating over mappings for each said node.

10. The method of claim 2, wherein said step of determining mappings further includes the step of distinguishing between data elements and organizational elements of said input markup language code, and said step of traversing further includes the step of following paths in accordance with whether said mappings are data or organizational.

11. A computer implemented method for generating a XML markup language document from an Object usable in an object-oriented code, comprising the steps of:
identifying an input Object which is used in an object-oriented code, a destination XML markup language document, and a XML markup schema;
determining mappings between attributes of said input Object and said destination markup schema, wherein determining the mappings involves:
mapping a different Object attribute to each of the elements having the same name but different positions in said XML markup language document, wherein the Object attribute explicitly declares the meaning of the associated element implied by the associated position in the destination XML markup language document, wherein the associated position is based on a sequential order of occurrences of the elements having the same name; and
generating mapping metadata which defines how the data architecture of said XML markup language schema maps to an Object model corresponding to the input Object;
generating markup language code which includes XML markup elements with like names in an order determined by said different positions; and
storing said generated markup language code in said destination XML markup language document;
wherein determining mappings comprises allowing a user to establish relationships between said destination Object and XML markup schema using a graphic user interface.

12. The method of claim 11, wherein said step of considering each software Object comprises the step of:
for each node in said tree of nodes, reading the metadata for each said node.

13. The method of claim 11, wherein said step of considering comprises the step of: for each node in said tree of nodes, generating an Object corresponding to each said node, populating attributes of said generated Object with the data of the elements based on the mapping metadata.

14. The method of claim 11, wherein said step of considering comprises the step of: for each node in said tree of nodes, adding structure to said XML document based on XPath data within said metadata.

15. The method of claim 11, wherein said markup language document has one or more elements containing data, said Object model has one or more Object classes, each Object class having one or more attributes, and said mapping data comprises a name of an Object attribute and a location of corresponding XML data.

16. The method of claim 11, wherein said software Objects comprise platform-independent Objects.

17. The method of claim 11, wherein said step of determining mappings further comprises the step of distinguishing between data elements and organizational elements in said markup language code and said step of considering further comprises the step of generating markup code in accordance with whether mappings corresponding to each said software Object, are data or organizational, adding structure as required.

18. A system for communicating data comprising:
a client computer;
a remote server; and
a communication network interconnecting said client computer and said remote server;
said remote server is configured to transmit XML documents to said client computer, via said communication network; and
said client computer is configured to respond to receipt of said XML documents by:
identifying an input XML document, a destination Java Object and an XML schema;
determining mappings between the XML schema and the destination Java Object, wherein determining the mappings involves:
generating a different Java Object attribute from each of the XML elements having the same name but different positions in said input markup language document, wherein the Java Object attribute explicitly declares the meaning of the associated element implied by the associated position in the XML code, wherein the associated position is based on a sequential order of occurrences of the elements having the same name;
generating mapping metadata which defines how the data architecture of the XML schema maps to said destination Java Object; and allowing a user to establish relationships between said destination Object and markup schema using a graphic user interface; instantiating the destination Java Object which includes different Java Object attributes generated from elements in the input XML code with the same name but different positions.

19. A system for communicating data comprising:
a client computer;
a remote server; and
a communication network interconnecting said client computer and said remote server;
said remote server is configured to receive XML documents from said client computer, via said communication network; and said client computer is configured to convert Objects to XML format for transmission to said remote server by:

identifying an input Java Object, a destination XML document, and an XML schema;

determining mappings between attributes of said input Java Object and said the XML schema, wherein determining the mappings involves:

assigning a different Java Object attribute to each of the elements having the same name but different positions in said markup language document, wherein the Java Object attribute explicitly declares the meaning of the associated element implied by the associated position in the destination XML document, wherein the associated position is based on a sequential order of occurrences of the elements having the same name;

generating mapping metadata which defines how the data architecture of XML schema maps to an Object model corresponding to the input Java™ Object and allowing a user to establish relationships between said destination Object and markup schema using a graphic user interface; generating XML code which includes XML elements with like names in an order determined by said different positions; and storing said generated XML code in said destination XML document.

* * * * *

UNITED STATES PATENT AND TRADEMARK OFFICE
CERTIFICATE OF CORRECTION

PATENT NO. : 7,526,490 B2
APPLICATION NO. : 10/864850
DATED : April 28, 2009
INVENTOR(S) : Doughan It is certified that error appears in the above-identified patent and that said Letters Patent is hereby corrected as shown below:

On face page, in field (56), in column 2, under "Other Publications", line 1, delete "Oreinted" and insert -- Oriented --, therefor.

In column 13, line 32, delete "addressshipping" and insert -- addressShipping --, therefor.

In column 20, line 5, in claim 19, delete "Java™" and insert -- Java --, therefor.

Signed and Sealed this

Eighth Day of June, 2010

David J. Kappos
*Director of the United States Patent and Trademark Office*